US008923150B2

(12) United States Patent
Mourad et al.

(10) Patent No.: US 8,923,150 B2
(45) Date of Patent: Dec. 30, 2014

(54) FRAME STRUCTURE OF A WIRELESS COMMUNICATION SYSTEM, AND METHOD AND APPARATUS FOR TRANSMITTING AND RECEIVING A PLURALITY OF DATA STREAMS THROUGH THE FRAME STRUCTURE

(75) Inventors: Alain Mourad, Middlesex (GB); Ismael Gutierrez, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 13/442,497

(22) Filed: Apr. 9, 2012

(65) Prior Publication Data

US 2012/0257586 A1    Oct. 11, 2012

(30) Foreign Application Priority Data

Apr. 8, 2011 (GB) .................................. 1106033.2

(51) Int. Cl.
| | | |
|---|---|---|
| H04L 12/26 | (2006.01) | |
| H04L 12/28 | (2006.01) | |
| H04H 20/95 | (2008.01) | |
| H04H 20/16 | (2008.01) | |
| H04L 1/00 | (2006.01) | |
| H04L 1/08 | (2006.01) | |

(52) U.S. Cl.
CPC ............. *H04H 20/95* (2013.01); *H04H 20/16* (2013.01); *H04L 1/0072* (2013.01); *H04L 1/0079* (2013.01); *H04L 1/08* (2013.01)
USPC ............................ 370/252; 370/392; 370/474

(58) Field of Classification Search
None
See application file for complete search history.

(56) References Cited

U.S. PATENT DOCUMENTS

| | | | |
|---|---|---|---|
| 2005/0289434 A1* | 12/2005 | Kim ............................... | 714/755 |
| 2009/0203326 A1 | 8/2009 | Vesma et al. | |
| 2010/0085985 A1* | 4/2010 | Pekonen et al. ............... | 370/474 |
| 2010/0195668 A1 | 8/2010 | Robert et al. | |
| 2010/0246719 A1 | 9/2010 | Ko et al. | |
| 2011/0044393 A1 | 2/2011 | Ko et al. | |
| 2012/0327955 A1* | 12/2012 | Herrmann et al. ............ | 370/476 |

FOREIGN PATENT DOCUMENTS

EP    0 973 284    1/2000

OTHER PUBLICATIONS

Digital Video Broadcasting (DVB); Frame Structure Channel Coding and Modulation for a Second Generation Digital Terrestrial Television Broadcasting System (DVB-T2), Final Draft ETSI EN 302 755 V1.2.1, European Standard (Telecommunication Series), Oct. 2010.
Ismael Gutierrez: "L1 Signalling Optimization", Apr. 14, 2011.
Jan Zoellner: "Considerations on L1 Signalling Robustness", Dec. 14, 2010.

* cited by examiner

*Primary Examiner* — Ashley Shivers
(74) *Attorney, Agent, or Firm* — The Farrell Law Firm, P.C.

(57) ABSTRACT

A method and apparatus are provided for transmitting and receiving data through a frame in a wireless communication system, the method including: generating a frame including a preamble section and a data section, the preamble section includes fixed data items and configuration data items, and the data section includes at least one Physical Layer Pipe (PLP); and transmitting the generated frame. The configuration data items are related to the at least one PLP, and the preamble section of the frame is generated according to repetition lengths of the configuration data items.

20 Claims, 7 Drawing Sheets

| Field | | Size (bits) |
|---|---|---|
| subslices_x_frame | | 15 |
| Num_PLP_config | | 8 |
| Num_Aux | | 4 |
| Aux_Config_RFU | | 8 |
| for i=0..NUM_RF-1{ | | |
| | RF_IDX | 3 |
| | FREQUENCY | 32 |
| } | | |
| if S2=="xxx1"{ | | |
| | FEF_TYPE | 4 |
| | FEF_LENGTH | 22 |
| | FEF_INTERVAL | 8 |
| } | | |
| for i=0.. Num_PLP_config-1{ | | |
| | PLP_ID | 8 |
| | PLP_TYPE | 3 |
| | PLP_PAYLOAD_TYPE | 5 |
| | FF_FLAG | 1 |
| | FIRST_RF_IDX | 3 |
| | FIRST_FRAME_IDX | 8 |
| | PLP_GROUP_ID | 8 |
| | PLP_COD | 3 |
| | PLP_MOD | 3 |
| | PLP_ROTATION | 1 |
| | PLP_FEC_TYPE | 2 |
| | PLP_NUM_BLOCKS_MAX | 10 |
| | FRAME_INTERVAL | 8 |
| | TIME_IL_LENGTH | 8 |
| | TIME_IL_TYPE | 1 |
| | INBAND_FLAG | 1 |
| | RESERVED_1 | 16 |
| | L1Config_Repetition_Length | 4 |
| } | | |
| Reserved | | 32 |
| for i=0..NUM_AUX-1{ | | |
| | AUX_RFU | 32 |
| } | | |

FIG.3

| Field | | bits |
|---|---|---|
| subslices_x_frame | | 15 |
| Num_PLP_Config | | 8 |
| NUM_PLPMODES | | 6 |
| Num_Aux | | 4 |
| Aux_Config_RFU | | 8 |
| for i=0..NUM_RF-1{ | | |
| | RF_IDX | 3 |
| | FREQUENCY | 32 |
| } | | |
| if S2=="xxx1"{ | | |
| | FEF_TYPE | 4 |
| | FEF_LENGTH | 22 |
| | FEF_INTERVAL | 8 |
| } | | |
| for i=0..NUM_PLP_Confgi-1{ | | |
| | PLPMODE_ID | 6 |
| | PLP_ID | 8 |
| | FF_FLAG | 1 |
| | FIRST_RF_IDX | 3 |
| | FIRST_FRAME_IDX | 8 |
| | PLP_GROUP_ID | 8 |
| } | | |
| for i=0..NUM_PLPMODES-1{ | | |
| | PLP_TYPE | 3 |
| | PLP_PAYLOAD_TYPE | 5 |
| | PLP_COD | 3 |
| | PLP_MOD | 3 |
| | PLP_ROTATION | 1 |
| | PLP_FEC_TYPE | 2 |
| | PLP_NUM_BLOCKS_MAX | 10 |
| | FRAME_INTERVAL | 8 |
| | TIME_IL_LENGTH | 8 |
| | TIME_IL_TYPE | 1 |
| | INBAND_FLAG | 1 |
| | RESERVED_1 | 16 |
| | L1Config_Repetition_Length | 4 |
| } | | |
| Reserved | | 32 |
| for i=0..NUM_AUX-1{ | | |
| | AUX_RFU | 32 |
| } | | |

FIG.6

FRAME STRUCTURE OF A WIRELESS COMMUNICATION SYSTEM, AND METHOD AND APPARATUS FOR TRANSMITTING AND RECEIVING A PLURALITY OF DATA STREAMS THROUGH THE FRAME STRUCTURE

PRIORITY

This application claims priority under 35 U.S.C. §119(a) to U.K Patent Application No.: 1106033.2, which was filed in the U.K. Intellectual Property Office on Apr. 8, 2011, the entire content of which is incorporated herein by reference.

FIELD OF THE INVENTION

The present invention relates to frame structure of a wireless communication system, and to a method and apparatus for transmitting and receiving data streams through the frame structure.

BACKGROUND OF THE INVENTION

A wireless broadcast system, such as a Digital Video Broadcasting (DVB) system, may transmit data in a sequence of frames. For example, a DVB system may operate according to a DVB-Terrestrial 2nd Generation (T2) standard, a DVB-Next Generation Handheld (DVB-NGH) standard, Advanced Televisions Systems Committee (ATSC), Integrated Services Digital Broadcasting (ISDB), or Digital Multimedia Broadcasting (DMB).

Each broadcast frame typically includes a preamble section and a data section, which are time-multiplexed. For example, the data section carries data arranged in a number of data streams referred to as Physical Layer Pipes (PLPs). A PLP carries a service such as a video channel provided to a user.

Reception of the data from the frames, and reception of the data streams, may be assisted by signaling, which may be carried in the preamble of the frame, i.e., Out-of-Band (OB) signaling, and/or may be carried in the data section, e.g., of the preceding frame, i.e., In-Band (IB) signaling. The signaling may be referred to as physical layer signaling, or Layer 1 (L1) signaling.

The preamble section of a frame includes various parts, an L1-Config (configuration) part and an L1-Dyn (dynamic) part. The L1-config part typically carries information that is valid for each frame of a super-frame, and is typically the same for each frame of the super-frame. The L1-Dyn part carries information that may vary from one frame to the next.

With an increasing use of signal compression techniques and lower data rate services that may be more robust in particular in mobile environments, the number of PLPs carried by a sequence of frames is potentially large. For example, in DVB-T2, up to 255 PLPs may be supported.

Because at least some of the transmitted information varies between the different PLPs, the signaling information transmitted in the preamble portion may represent a large overhead per frame in terms of data capacity. In particular, the L1-Config part often takes up a high proportion (e.g., more than 60%) of the signaling information of the preamble section. Consequently, the overhead resulting from the L1-Config is particularly high.

SUMMARY OF THE INVENTION

Accordingly, embodiments of the present invention are designed to address at least the problems and/or disadvantages described above and to provide at least the advantages described below.

In accordance with an aspect of the present invention, a method is provided for transmitting data through a frame in a wireless communication system, the method comprising: generating a frame including a preamble section and a data section, the preamble section includes fixed data items and configuration data items, and the data section includes at least one of PLP (Physical Layer Pipe)s; and transmitting the generated frame, wherein the configuration data items related to the at least one of the PLPs, the preamble section of the frame is generated according to repetition lengths of the configuration data items.

In accordance with another aspect of the present invention, a method for receiving data through a frame in a wireless communication system, the method comprising: receiving a frame including a preamble section and a data section, the preamble section includes fixed data items and configuration data items, and the data section includes at least one Physical Layer Pipe (PLP); and interpreting the preamble section of the frame, wherein the configuration data items related to the at least one PLP, the preamble section of the frame is interpreted according to repetition lengths of the configuration data items.

In accordance with another aspect of the present invention, an apparatus is provided for an transmitter for transmitting data through a frame in a wireless communication system, the method comprising: a frame generator for generating a frame including a preamble section and a data section, the preamble section includes fixed data items and configuration data items, and the data section includes at least one of Physical Layer Pipe (PLP); and a transmitter for transmitting the generated frame, wherein the configuration data items related to the at least one PLP, the preamble section of the frame is generated according to repetition lengths of the configuration data items.

In accordance with another aspect of the present invention, an apparatus is provided for a receiver for receiving data through a frame in a wireless communication system, the method comprising: a receiver for receiving a frame including a preamble section and a data section, the preamble section includes fixed data items and configuration data items, and the data section includes at least one of Physical Layer Pipe (PLP); and a controller for interpreting the preamble section of the frame, wherein the configuration data items related to the at least one PLP, the preamble section of the frame is interpreted according to repetition lengths of the configuration data items.

BRIEF DESCRIPTION OF THE DRAWINGS

The above and other aspects, features, and advantages of certain embodiments of the present invention will become more apparent from the following detailed description taken in conjunction with the accompanying drawings, in which:

FIG. 3 illustrates an example of data carried in an L1-Config signaling portion of a frame in accordance with an embodiment of the invention;

FIG. 6 illustrates data carried in an L1-Config signaling portion of a frame in accordance with an embodiment of the invention;

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Although various embodiments of the invention will be described below with reference to a DVB-NGH standard, which is based on the $2^{nd}$ generation terrestrial DVB-T2 system, the present invention is also applicable to other wireless broadcast systems, and is not limited to the transmission of digital video signals.

Further, although various embodiments of the invention will be described where data is transmitted using Orthogonal Frequency-Division Multiplexing (OFDM) in PLPs, the invention is not limited to such arrangements, and other types of data streams may be used.

Figure 1:
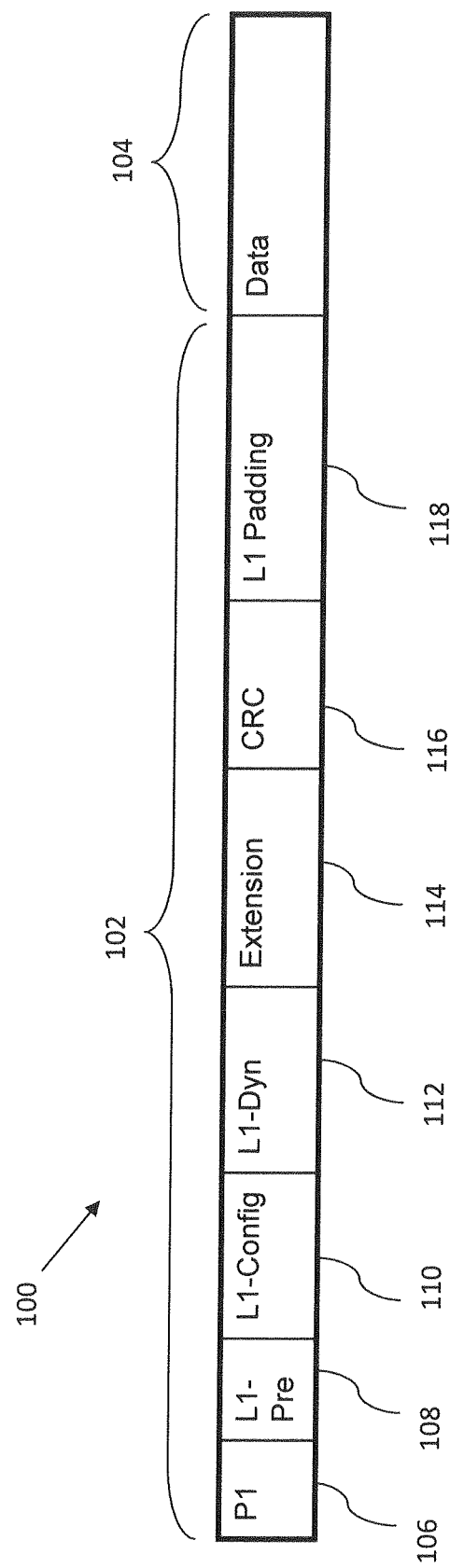
FIG. 1 illustrates a data frame in accordance with an embodiment of the invention.

FIG. 1 illustrates a frame for transmitting data in accordance with an embodiment of the present invention.

Referring to the FIG. 1, the frame 100 includes a preamble section 102 and a data section 104. The preamble section 102 includes signaling information. Specifically, portions P1 106, L1-pre 108, L1-Config 110, L1-Dyn 112, L1-Dynamic Extension 114, Cyclic Redundancy Check (CRC) 116, and L1 Padding 118. Although not illustrated in FIG. 1, the L1-Config 110 arranged after the L1-pre 108 to the L1 Padding 118 are defined L1-post. The data section 104 includes data, e.g., data transmitted in PLPs. Although not illustrated in FIG. 1, the data section 104 also includes multiple portions for transmitting different types of data.

The P1 signaling portion 106 includes data for identifying the preamble section 102 in the frame. The signaling portion for the L1-Pre 108 includes signaling information for receiving the remainder of the preamble section 102 and information at least to the modulation and coding scheme.

The portion L1-Config 110 carries information that is valid for each frame (e.g., the frame 100) of a given super-frame including a plurality of frames, and is basically the same for each frame of the super-frame. The information included the portion L1-Config 110 includes configuration data related to PLPs carried within the super-frame, specifically a number of PLPs carried within the super-frame, or the modulation type information used by an associated PLP.

Generally, the L1-Dyn portion 112 carries information that varies from frame to frame, different information per frame, and the L1-Dyn portion 112 mainly includes information decoding the PLPs within the frame. The L1-Dyn signaling portion 112 may include an index of the frame within the super-frame and/or a start address of a PLP, for example.

The L1-Dynamic Extension 114 includes additional signaling information not included in the other portions. The CRC 116 includes CRC-codes for detecting transmission errors at the receiver.

The L1 Padding 118 is a variable-length field and is inserted after the CRC field 116 to ensure that multiple coding blocks of the L1-post signaling have the same information size when the L1-post signaling is segmented into multiple blocks and these blocks are separately encoded.

Different signaling portions of the preamble section 102 may be encoded for transmission together, or separately. For example, the L1-Config 110 may be coded together with, or separate from, the L1-Dyn 112.

As described above, the data section 104 carries data arranged in PLPs. However, each PLP is not necessarily mapped per every frame.

In accordance with an embodiment of the present invention, different repetition lengths are set for different types of configuration data items so that different types of configuration data items are repeated according to different lengths within a frame structure including multiple frames. the repetition length n represents that different types of configuration data items are generated by n frames.

Figure 2:
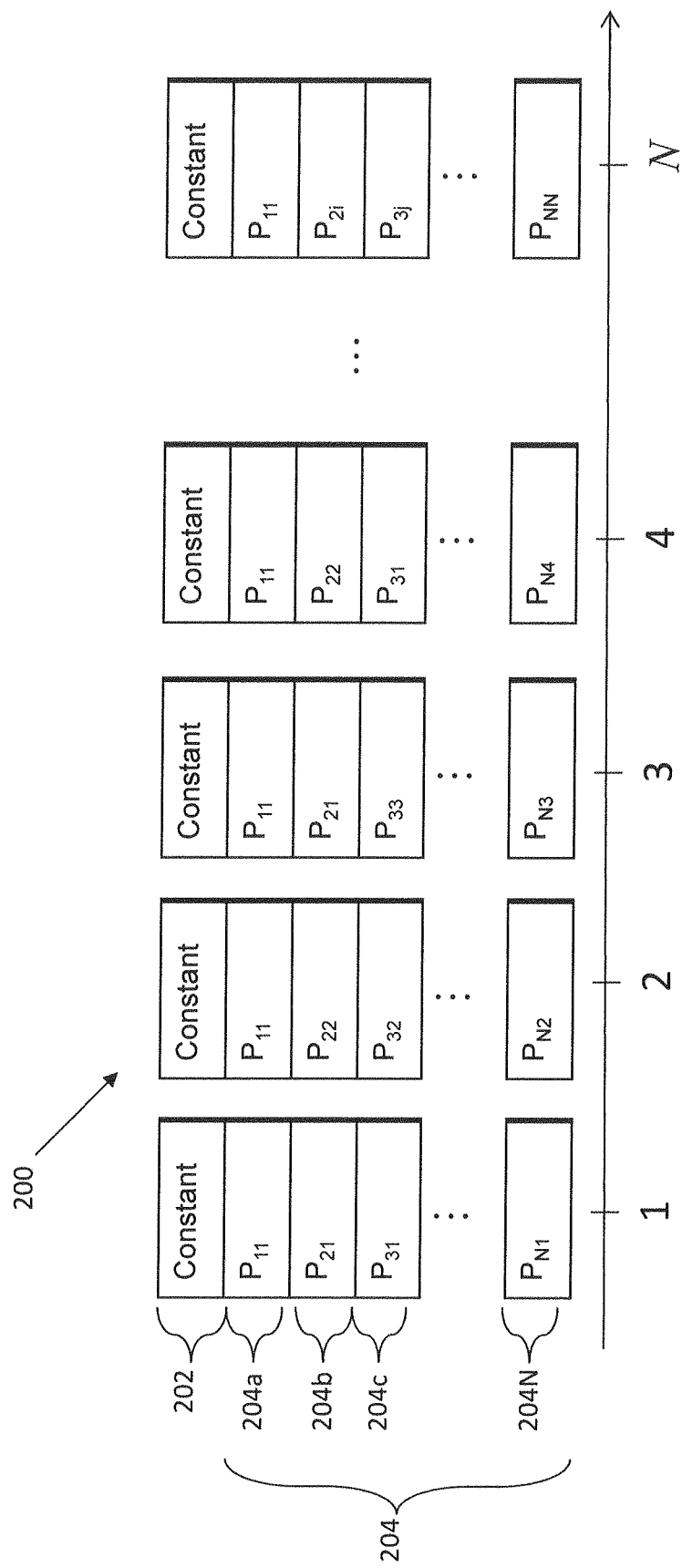
FIG. 2 illustrates a frame structure in accordance with an embodiment of the invention.

FIG. 2 illustrates a frame structure in accordance with an embodiment of the invention. Specifically, FIG. 2 illustrates a frame structure including n frames in which different configuration data items $P_{nm}$ are transmitted in each frame of the frame structure 200. Further, FIG. 2 only illustrates data included in the L1-Config 110 of each frame. Other parts except parts for the L1 config 110 in the frame structure are omitted for conciseness.

Referring to the FIG. 2, the data included in the L1-Config 110 includes fixed (constant data) data 202 and configuration data 204. The fixed data 202 includes configuration information that is independent of any particular PLP. For example, the fixed data 202 may include signaling information items, such as Time Frequency Slicing (TFS) items, Future Extension Frame (FEF) signaling information items and/or auxiliary streams information items, which are transmitted in each frame.

The configuration data 204 includes configuration data items that each relate to one or more PLPs, and are required for receiving the one or more PLPs to which they relate. The configuration data 204 of the FIG. 2 is generated as a signaling loop including signaling information relate to each of the PLPs. Specifically, the configuration data 204 of the FIG. 3 is generated a format of loop including PLP_IDs, the PLP ID is signaling information related to the PLPs, represents 8 bits. that is the signaling information related to PLPs having Num_PLP_config represents a format of loop to i=0 from Num_PLP_config-1, wherein i is a variable value indicates a loop, and i doesn't transmit substantially. For easy explanation, signalling information related to a specific PLP_ID denotes 'PLP signalling loop'. The configuration data items are separated into different types 204a to 204N, with different repetition lengths being set for each of the different types of configuration data items. Each of the different types 204a to 204N is generated with signalling information related to at least one of PLP_ID, the 'PLP signalling loop'.

Herein, $P_{nm}$ indicates configuration data items repeats by frame n (a repetition length n), such that they are repeated every n frames, and which are first transmitted in frame m. Thus, in FIG. 2, configuration data items $P_{11}$ are repeated in each frame, configuration data items $P_{21}$ are repeated in odd frames 1, 3, 5, etc., and configuration data items $P_{22}$ are repeated in even frames 2, 4, 6, etc. A configuration data item corresponding to an Nth frame $P_{2i}$ is $P_{21}$ or $P_{22}$ and is determined according to a value of N. That is, i is 1 or 2 according to a value of N.

The configuration data items $P_{31}$ are repeated in frames 1, 4, 7, etc. A configuration data item corresponding to Nth frame $P_{3j}$ is $P_{31}$ or $P_{32}$ or $P_{33}$ and is determined according to a value of N. That is, j is 1 or 2 or 3, according to a value of N.

A lowest repetition length set is that for the configuration data items $P_{Nm}$, which are repeated every n frames. Thus, the repetition length n defines a number of frames (n−1) generated before a type of configuration data item having a repetition length n is repeated.

Accordingly, each configuration data item is included at least once in the frame structure. However, because not all of configuration data items are repeated during each frame of the frame structure, less data could be transmitted during each frame, thereby reducing signaling overhead compared to methods in which all configuration data items are transmitted in every frame.

Further, because different repetition lengths are set for different types of configuration data items, the decoding delay that occurs at the receiver, at initialization or when changing channels (zapping), etc., can be controlled according to the service requirements of the PLP to which a given configuration data item relates (e.g., the average delay in receiving a configuration data item which is repeated every n frames being n/2 times the length of each frame). Thus, configuration data items relating to PLPs for which a long delay is undesirable may be allocated a lower repetition length than configuration data items relating to PLPs for which a delay may be more tolerable.

Often it is desirable to set different repetition lengths for different PLPs carrying data relating to different parts of the same service. For example, a basic version of a service can be provided with minimal expected delay, and with an enhanced version of the service becoming subsequently available. The basic version of the service may use a Single-Input and Single-Output (SISO) configuration, while the enhanced version of the same service uses a Multiple-Input and Multiple-Output (MIMO) configuration, for example.

When transmitting using a Scalable Video Coding (SVC) scheme, configuration data items for receiving the base layer of the scheme may be transmitted at a higher repetition length than the configuration data items for receiving the enhanced layer of the scheme. Accordingly, the receiver may initially decode the base stream, and display to the user, immediately after receiving the configuration data items for the base layer, without having to wait for those relating to the enhanced layer.

Although the frame structure 200 in FIG. 2 illustrates N frames (a number equal to the longest repetition length for the transmission), there is no limit to the length of a frame structure according to which data is transmitted in accordance with embodiments of the present invention. Further, the frames of a frame structure may be arranged into super-frames. For example, a maximum repetition length set for the transmission may be selected such that the length of a super-frame is equal to, or a multiple of, N.

FIG. 3 illustrates an example of data carried in an L1-Config portion of a frame in accordance with an embodiment of the invention. Specifically, FIG. 3 illustrates a table of fixed data 202 and configuration data 204, along with exemplary corresponding data sizes, included in the signaling portion for the L1-Config 110 of a frame in accordance with an embodiment of the present invention.

Referring to FIG. 3, the fixed data 202 includes a data item Num_PLP_config 202a, which indicates a number of PLPs for which configuration data 204 is included in each frame or super-frame. The configuration data 204 includes various configuration data items. It should be understood that the term "configuration data items" may relate to either data included in a single field within the configuration data, or to data included in a set of related fields.

In accordance with an embodiment of the present invention, an identifier of the PLP is identified in a configuration data item PLP_ID 206, and a configuration data item L1Config_Repetition_Length 208 indicates the repetition length of the configuration data items relating to the PLP identified. Although illustrated as a new field in FIG. 3, alternatively, the L1Config_Repetition_Length 208 may be included in an extension field, such as the "Reserved_1" field.

In accordance with an embodiment of the present invention, configuration data items are ordered for transmission based on their repetition length. Accordingly, configuration data items having a lower repetition length are transmitted before those having a higher repetition length. Configuration data items having the same repetition length may further be ordered so that they are transmitted in an order of the PLP_ID 206 of the PLP to which they relate. For example, configuration data items may be arranged in an ascending order by PLP_ID 206. By ordering the configuration data items in a predictable way, the receiver may anticipate the PLPs to which configuration data items transmitted in subsequent frames relate.

Figure 4:
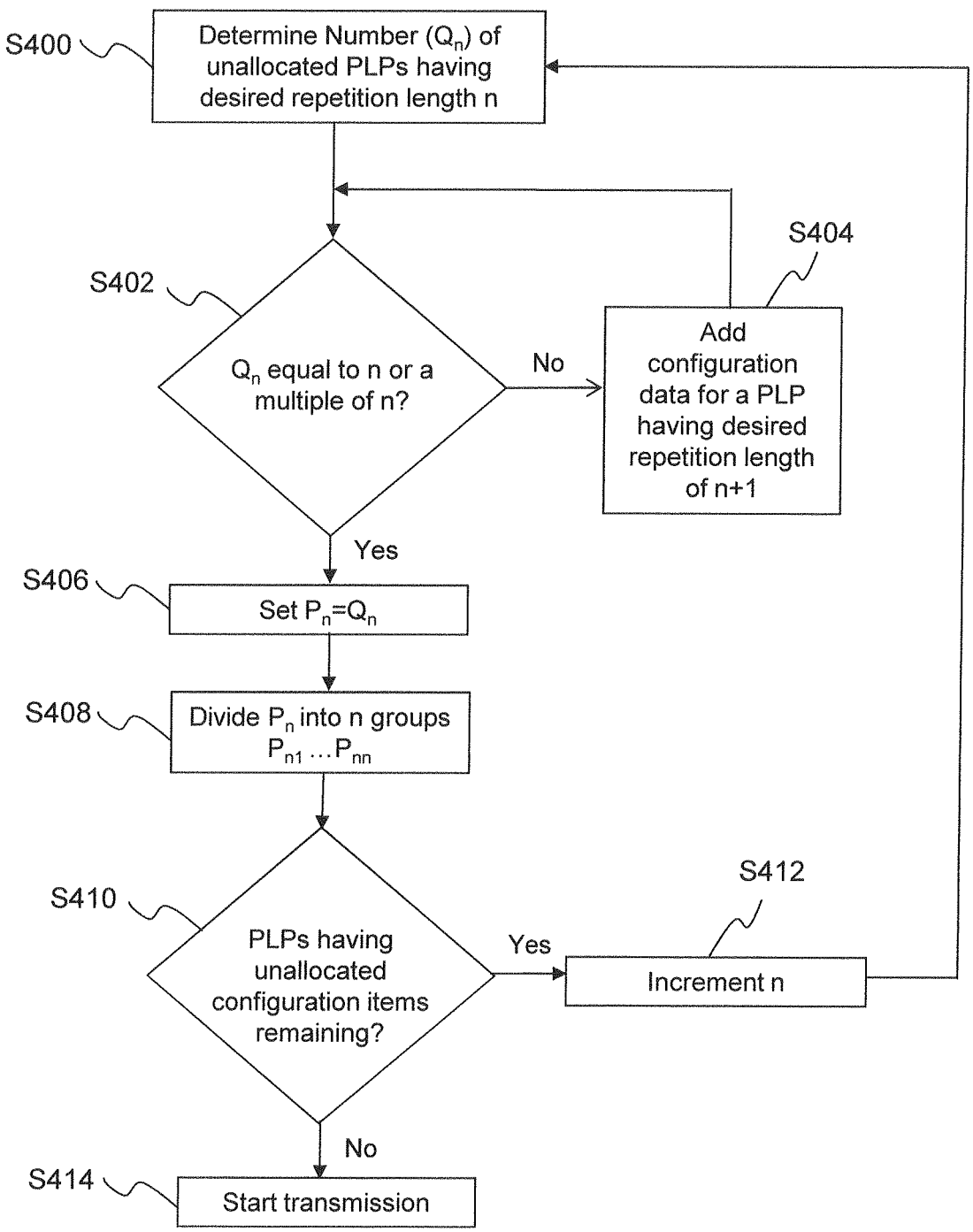
FIG. 4 is a flow diagram illustrating a process for arranging configuration data items in different types in accordance with an embodiment of the invention.

FIG. 4 is a flow diagram illustrating a method of arranging different types of configuration data items in accordance with an embodiment of the present invention.

Referring to FIG. 4, in step S400, a transmitter determines a set $S_n$ of a number Qn of unallocated PLPs having a desired repetition length of n. The $Q_n$ represents a number of 'PLP signaling loop' of configuration data having a repetition length n, set by network operator. $S_n$ represents 'PLP signaling loop's having the repetition length n. As described above, the desired repetition length n may be determined based on a service requirement, set by a network operator, for example, in relation to each of the PLPs.

In step S402, the transmitter determines whether $Q_n$ is equal to or a multiple of n (e.g., if n is 4, it is determined whether $Q_N$ is 4, 8, 12, etc., or whether it is a number which is not a multiple of 4).

If it is determined that $Q_n$ is not equal to n, or a multiple thereof, then configuration data for a PLP, having a desired repetition length of n+1, 'PLP signaling loop' is added to the set $S_n$, so that the value of $Q_n$ increases by 1 in step S404. Step S404 is performed because the service for PLP requiring a repetition length of n+1 suffers from no degradation, and in fact is improved, by reducing the repetition length to n. After step S404, the process then returns to step S402, and steps S402 and S404 are repeated until the value of $Q_n$ is to be equal to or a multiple of n.

When $Q_n$ is equal to or a multiple of n, in step S406, $P_n$, i.e., the number of PLPs for which corresponding configuration data items are transmitted at a repetition length n, is set to $Q_n$. $P_n$ represents a repetition length resetting by an algorithm. That is, when $Q_n$ is equal to or a multiple of n, the configuration data items included in $S_n$ are categorized as being of a type having a repetition length n, e.g., with $S_1$, $S_2$, $S_3$, and $S_N$ corresponding respectively to data types 204a, 204b, 204c and $204_N$, as described above with reference to FIG. 2.

In step S408, the configuration data items included in $S_n$ are further categorized into n groups $P_{n1}$ to $P_{nm}$, corresponding to the data items $P_{nm}$, as described above in relation to FIG. 2.

The $P_{nm}$, for any given value of n may be selected to include configuration data items relating to the same number of PLPs irrespective of the value of m.

In step S410, the transmitter determines whether there are any remaining PLPs for which the corresponding configuration data items have not yet been allocated (i.e., for which no repetition length has been set). When there are configuration data items that have not yet been allocated, then the value of n is incremented in step S412, and the process returns to step S400, repeating the processes described above using the incremented value of n.

However, when there are no further configuration data items to be allocated, transmission of the data in accordance with the frames arranged in the preceding steps is initiated in step S414.

By repeating the process of the FIG. 4 incrementally for values of n between a minimum and a maximum value, configuration data items for all PLPs are categorized into different types having a repetition length which is set at a value equal to or less than a desired repetition length determined based on a service requirement associated with the PLP, thereby ensuring that the quality of service is maintained at or above the desired level. Further, because the number of PLPs having a repetition length less than the desired length is kept to a minimum, signaling overhead is reduced by not repeating all configuration data items in each frame.

Although it is assumed in step S404 that is a PLP having a desired repetition length of n+1, when no such PLP exists, configuration data items for PLPs having a desired repetition of more than n+1 may be used. If the configuration data for all PLPs has already been allocated (i.e., if n is at the maximum value for the PLPs being transmitted), then dummy configuration data items relating to dummy PLPs may instead be used. Additionally or alternatively, configuration data relating to one or more already allocated PLPs may be repeated to ensure that $Q_n$ is equal to or a multiple of n.

By dividing each type of configuration data item into n groups, at step S408, such that each group of a given type relates to the same number of PLPs, each of the frames in the frame structure will have a constant number of data items, i.e., that the signaling capacity for each frame remains constant. Consequently, scheduling may be simplified.

Table 1 shows an example of a pseudo-code for an algorithm for arranging the configuration data items in a similar manner to that described with reference to FIG. 4.

TABLE 1

```
//Q(n):Set initial configuration vector
//P(n): number of PLPs signaled per frame of repetition length n
//M: total number of PLPs signaled every frame
//N: highest repetition length
Rr(n) = Q(n)/n, n=1:N
Rc(n) = ceil(Rr), n=1:N
R(n) = (Rc(n) – Rr(n))*n, n=1:N
for (i=1:N)
   for (j=i+1:N)
      while ((R(i)>0) and (Q(j)>0))
Q(j) = Q(j) – 1
Q(i) = Q(i) + 1
Rr(n) = Q(n)/n, n=1:N
Rc(n) = ceil(Rr), n=1:N
R(n) = (Rc(n) – Rr(n))*n, n=1:N
      end
   end
end
P(n)=Q(n)/n, n=1:N
M=sum(P(n)), n=1:N
```

For example, the transmission apparatus performing the process illustrated in FIG. 4 may include an input communications interface for receiving data streams, e.g., different digital video broadcast channels, to be encoded into a frame structure, a processor, or set of processors, for performing processing steps in conjunction, where appropriate, with a data storage device, which may store data such as the desired repetition lengths described above. The transmission apparatus also includes an output communications interface for wirelessly transmitting data.

Similarly, the data transmitted by the transmission apparatus is received by one or more receiver apparatuses, each including an input communications interface for wirelessly receiving the data, a processor, or set of processors, for performing, in conjunction with a data storage means where appropriate, processing of the received signal as is now described, and a video display, an audio transmitter, and/or an output communications interface for outputting one or more selected decoded data streams.

Upon receiving the data transmitted in a frame structure as described above, the receiver apparatus selects different PLPs to be received, the different PLPs corresponding to different repetition lengths, for example, in response to a change of channel at the receiver apparatus. The receiver apparatus receives configuration data items corresponding to each selected PLP, and receives the corresponding PLP using the received corresponding configuration data items.

Advantageously, the data relating to a given PLP carried in an L1-config signaling portion 110 of a given frame may be self-decodable, i.e., may contain all data necessary for decoding, so that decoding in relation to a given PLP can be started as soon as the corresponding configuration data items are received. Further, once a first instance of a given configuration data item has been received and decoded, and because the configuration data items are ordered in a predictable way, on the basis of repetition length and/or PLP identifier as described above, the it may be unnecessary to decode subsequent instances of the same configuration data item.

Figure 5:
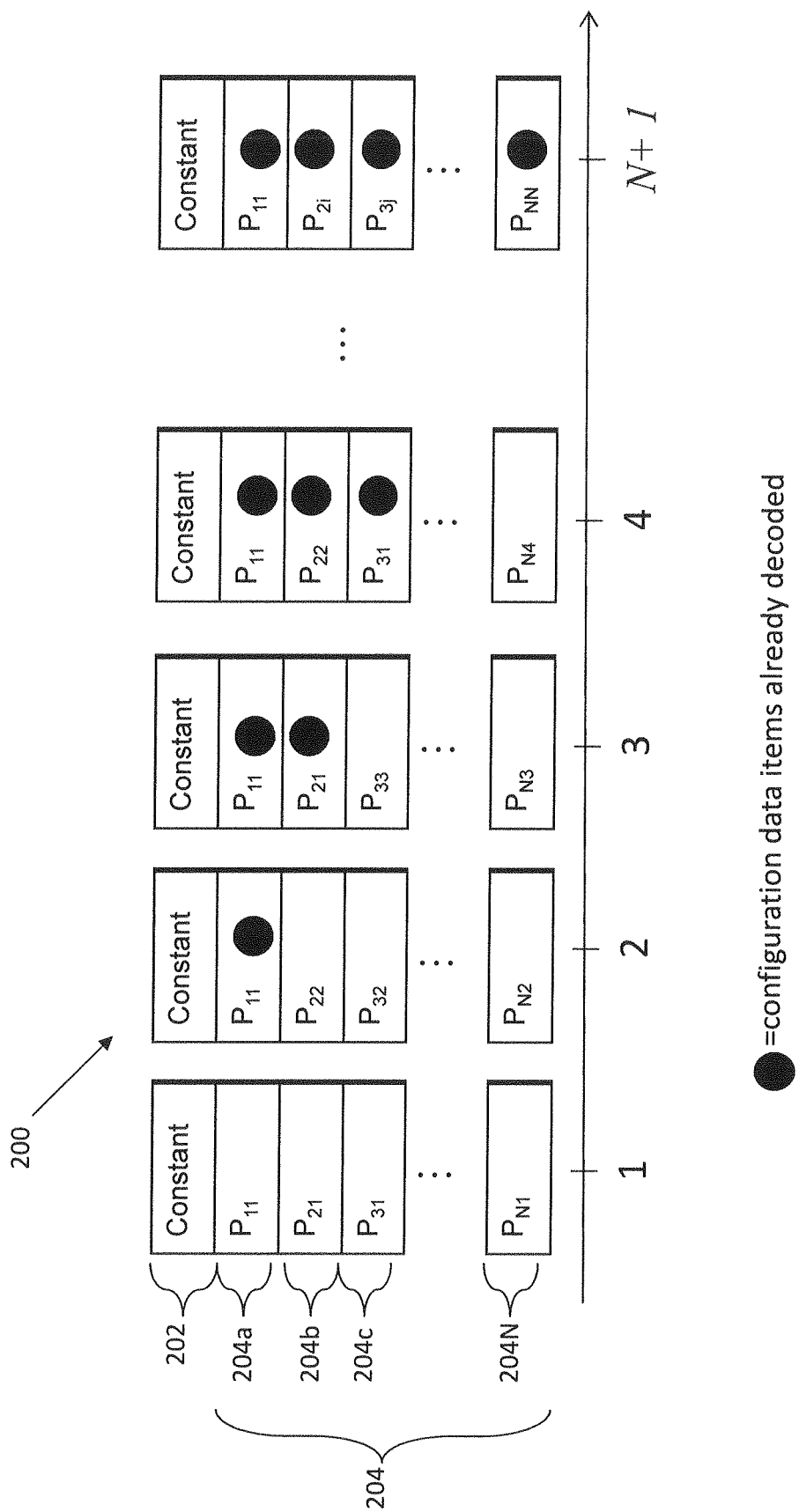
FIG. 5 illustrates data carried in a frame structure being decoded in accordance with an embodiment of the invention.

FIG. 5 illustrates data carried in a frame structure being decoded in accordance with an embodiment of the invention.

Referring to FIG. 5, assuming that each configuration data item is decoded correctly the first time received, all configuration data items are decoded after N+1 frames in a frame structure 200, where N is the longest repetition length set for the transmission.

To reduce the burden on the processing resources of the receiver apparatus, the first time a configuration data item is received and decoded, it may be stored in a data storage, i.e., a memory, of the receiver apparatus with the stored configuration data item being used to identify and receive the corresponding PLP in subsequent frames in the frame structure 200. Subsequent, repeated instances of the same configuration data item within a super-frame may then be flagged by the receiver to be ignored by the decoder and not decoded.

In accordance with an embodiment of the present invention, the stored instance can then be used to identify and receive the corresponding PLP in subsequent frames within the super-fame, even those that follow the frames including the repeated instances of the configuration data time.

In accordance with an alternative embodiment of the present invention, each instance of any given configuration data item transmitted in the frame structure may be decoded to maintain simplicity of receiver operation and/or to reduce decoding errors.

In accordance with an embodiment of the present invention, a receiver sets one or more values associated with a soft decoder to one or more predetermined values, to indicate that the configuration data item is already known. For example, a receiver generates Log Likelihood Ratios (LLRs), which are used as confidence factors in error correction for data items to be decoded in a soft decoder. The LLRs for the further, repeated instances of the configuration data items may then be set in the remainder of the super-frame to $+/-\infty$, to indicate that these configuration data items are already known.

The known configuration data items can be used to facilitate the decoding of other data, such as other data carried in the L1-Config 110 and/or data included in the L1-Dyn 112. Because some bits in the received data are already known (as indicated by the corresponding LLR having been set to $+/-\infty$) the robustness of decoding other bits in the received data increases in terms of error correction.

Further, when a given configuration data item has been received in a first set of data (for example, data in a given frame) and decoded, the decoded data can be used to facilitate in a decoding process of further sets of data including the configuration data item. Because the bits of the configuration data item are known, the robustness of error correction improves in relation further data items included in the further sets of data. These further data items may include data items carried in the L1-Config 110 of a frame, or another signaling portion, such as the L1-Dyn 112, which is coded together with the L1-Config 110.

When frames are arranged into super-frames, the configuration data may vary from super-frame to super-frame. Accordingly, in accordance with an embodiment of the present invention, a receiver apparatus decodes at least the first instance of each configuration data item in each super-frame. However, because the configuration data items may change infrequently, even between different super-frames, in another embodiment, the receiver apparatus does not decode the first instance of each configuration data item in each super-frame. Instead, an indication may be included in, for example, the L1-Dyn 112 indicating that the configuration data items has changed, and the receiver apparatus decodes new instances of configuration data in response to receiving this indication.

Further, the indication may indicate one or more PLPs whose corresponding configuration data items have changed. In this case, the receiver apparatus may newly decode configuration data items for only the PLPs indicated.

FIG. 6 illustrates data carried in an L1-Config signaling portion of a frame in accordance with an embodiment of the invention. Specifically, FIG. 6 illustrates an alternative arrangement for the constant data 202 and configuration data 204 included in the L1-Config of a frame.

Referring to FIG. 6, the number of PLP configurations is limited to a number lower than the number of PLPs in use, and the PLPs are classified according to the PLP configuration ("PLP mode") used. In this way, the configuration data items common to a given PLP mode are not being separately transmitted for each PLP of the given PLP mode. In FIG. 6, the different types of configuration data item may be assigned on a PLP by PLP basis, as described above, or instead on the basis of the different PLP modes.

Figure 7:
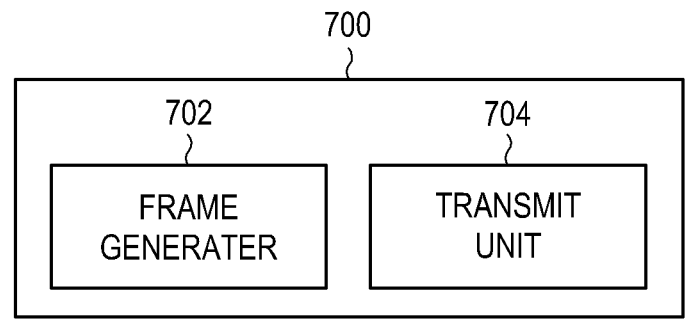
FIG. 7 illustrates a transmitter apparatus according to an embodiment of the present invention.

FIG. 7 illustrates a transmitter apparatus according to an embodiment of the present invention.

Referring to the FIG. 7, the transmitter apparatus 700 includes a frame generator 702 and a transmit unit 704. The frame generator 702 sets repetition lengths for each of a plurality of configuration data items mapped to signaling information for a preamble of the frame, and generates the frame corresponding to each of the repetition lengths set for each of a plurality of configuration data items. The transmit unit 704 repeatedly transmits the frame.

Figure 8:
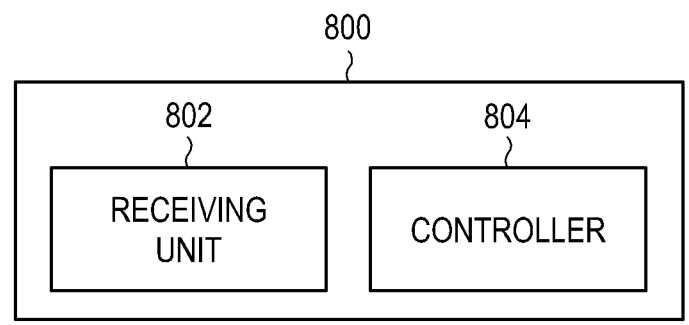
FIG. 8 illustrates a receiver apparatus according to an embodiment of the present invention.

FIG. 8 illustrates a receiver apparatus according to an embodiment of the present invention.

Referring to the FIG. 8, the receiver apparatus 800 includes a receiving unit 802 and a controller 804. The receiving unit 802 receives configuration data items related to each the data streams according to different repetition lengths set within a frame, and sequentially receives the plurality of data streams, the configuration data items is used to identify and receive Physical Layer Pipes (PLPs) for the data streams in subsequent frames in the frame. The controller 804 accumulates a number of received data streams by receiving each the plurality of data streams, and checks a number of the accumulated data streams is equal to a number for the plurality of data streams, and repeats receiving the configuration data items related to each the plurality of data streams and accumulating until the number of the accumulated data streams is equal to the number for the plurality of data streams.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for transmitting data through frames in a wireless communication system, the method comprising:
   generating a frame including a preamble section and a data section, the preamble section including fixed data items and a plurality of configuration data items, and the data section including at least one Physical Layer Pipe (PLP); and
   transmitting the generated frame,
   wherein the plurality of configuration data items are related to the at least one PLP,
   wherein each of the frames includes the plurality of the configuration data items which are repeatedly placed in a different number of consecutive frames according to a cyclic pattern, and
   wherein the cyclic pattern is differently determined for each type of the plurality of the configuration data items.

2. The method of claim 1, wherein a different number of consecutive frames is 1.

3. The method of claim 1, wherein a different number of consecutive frames of at least one of the plurality of configuration data items is equal to or lower than a number of the frames.

4. The method of claim 1, wherein if a different number of consecutive frames of a first configuration data item among the plurality of the configuration data items is equal to or higher than 2, the first data configuration item received at a first frame of the consecutive frames is used to identify and receive the corresponding PLP in subsequent frames.

5. The method of claim 1, wherein a configuration data item having a lower number of consecutive frames is transmitted before a configuration data item having a higher number of consecutive frames.

6. A method for receiving data through frames in a wireless communication system, the method comprising:
   receiving a frame including a preamble section and a data section, the preamble section including fixed data items and a plurality of configuration data items, and the data section including at least one Physical Layer Pipe (PLP); and
   interpreting the preamble section including each of the plurality of configuration data items having a cyclic pattern determined different for each type of the plurality of configuration data items,
wherein the plurality of configuration data items are related to the at least one PLP, and
wherein each of the frames includes the plurality of configuration data items, which are repeatedly placed in a different number of consecutive frames according to the cyclic pattern.

7. The method of claim 6, wherein a different number of consecutive frames is 1.

8. The method of claim 6, wherein a different number of consecutive frames for at least one of the plurality of configuration data items is equal to or lower than a number of the frames.

9. The method of claim 6, wherein if a different number of consecutive frames of a first configuration data item among the plurality of the configuration data items is equal to or higher than 2, the first data configuration item received at a first frame of the consecutive frames is used to identify and receive the corresponding PLP in subsequent frames.

10. The method of claim 6, wherein a configuration data item having a lower number of consecutive frames is transmitted before a configuration data item having a higher number of consecutive frames.

11. A transmitter for transmitting data through frames in a wireless communication system, the method comprising:
a frame generator for generating a frame including a preamble section and a data section, the preamble section including fixed data items and a plurality of configuration data items, and the data section including at least one Physical Layer Pipe (PLP); and
a transmitter for transmitting the generated frame,
wherein the plurality of configuration data items are related to the at least one PLP,
wherein each of the frames includes the plurality of the configuration data items which are repeatedly placed in a different number of consecutive frames according to a cyclic pattern, and
wherein the cyclic pattern is differently determined for each type of the plurality of the configuration data items.

12. The transmitter of claim 11, wherein a different number of consecutive frames is 1.

13. The transmitter of claim 11, wherein a different number of consecutive frames of at least one of the plurality of configuration data items is equal to or lower than a number of the frames.

14. The transmitter of claim 11, wherein if a different number of consecutive frames of a first configuration data item among the plurality of the configuration data items is equal to or higher than 2, the first data configuration item received at a first frame of the consecutive frames is used to identify and receive the corresponding PLP in subsequent frames.

15. The transmitter of claim 11, wherein a configuration data item having a lower number of consecutive frames is transmitted before a configuration data item having a higher number of consecutive frames.

16. A receiver for receiving data through frames in a wireless communication system, the method comprising:
a receiver for receiving a frame including a preamble section and a data section, the preamble section including fixed data items and a plurality of configuration data items, and the data section including at least one Physical Layer Pipe (PLP); and
a controller for interpreting the preamble section including each of the plurality of configuration data items having a cyclic pattern determined different for each type of the plurality of configuration data items,
wherein the plurality of configuration data items are related to the at least one PLP, and
wherein each of the frames includes the plurality of configuration data items, which are repeatedly placed in a different number of consecutive frames according to the cyclic pattern.

17. The receiver of claim 16, wherein a different number of consecutive frames is 1.

18. The receiver of claim 16, wherein a different number of consecutive frames for at least one of the plurality of configuration data items is equal to or lower than a number of the frames.

19. The receiver of claim 16, wherein if a different number of consecutive frames of a first configuration data item among the plurality of the configuration data items is equal to or higher than 2, the first data configuration item received at a first frame of the consecutive frames is used to identify and receive the corresponding PLP in subsequent frames.

20. The receiver of claim 16, wherein a configuration data item having a lower number of consecutive frames is transmitted before a configuration data item having a higher number of consecutive frames.

* * * * *